(12) United States Patent
Tanifuji

(10) Patent No.: US 8,054,353 B2
(45) Date of Patent: Nov. 8, 2011

(54) CAMERA SYSTEM FOR PROCESSING LUMINANCE AND COLOR SIGNALS USING ADDED PIXEL AND ADDING SYNC SIGNALS

(75) Inventor: Keizo Tanifuji, Tokyo (JP)

(73) Assignee: Sony Corporation, Tokyo (JP)

( * ) Notice: Subject to any disclaimer, the term of this patent is extended or adjusted under 35 U.S.C. 154(b) by 918 days.

(21) Appl. No.: 11/711,728

(22) Filed: Feb. 28, 2007

(65) Prior Publication Data

US 2007/0222878 A1 Sep. 27, 2007

(30) Foreign Application Priority Data

Mar. 1, 2006 (JP) ................ P2006-055143

(51) Int. Cl.
*H04N 3/14* (2006.01)
*H04N 9/083* (2006.01)
(52) U.S. Cl. .............. 348/294; 348/282; 348/311
(58) Field of Classification Search ......... 348/277–282, 348/294, 302, 311
See application file for complete search history.

(56) References Cited

U.S. PATENT DOCUMENTS

| 4,281,338 A * | 7/1981 | Takahashi et al. ........... 348/276 |
| 5,227,870 A * | 7/1993 | Asada et al. ................ 348/223.1 |
| 2004/0141079 A1 * | 7/2004 | Yamaguchi et al. .......... 348/308 |
| 2005/0185075 A1 * | 8/2005 | Neter ............................ 348/294 |
| 2006/0203113 A1 * | 9/2006 | Wada et al. .................. 348/302 |
| 2007/0098388 A1 * | 5/2007 | Turley et al. ................. 396/111 |

FOREIGN PATENT DOCUMENTS

| JP | 05-030517 A | 2/1993 |
| JP | 05-145859 A | 6/1993 |
| JP | 7-75409 | 8/1995 |
| JP | 08-307774 A | 11/1996 |
| JP | 2002-034049 | 1/2002 |
| JP | 2006-270298 A | 10/2006 |

* cited by examiner

*Primary Examiner* — Hung Lam
(74) *Attorney, Agent, or Firm* — Rader, Fishman & Grauer PLLC

(57) ABSTRACT

A method of controlling a camera system having a plurality of solid-state imaging devices is provided. The method includes supplying a horizontal addition control signal and a vertical addition control signal, phases of which are controlled, to the plurality of solid-state imaging devices; selecting pixel column(s) and row(s) of the plurality of solid-state imaging devices in accordance with the horizontal addition control signal and the vertical addition control signal; adding a plurality of pixel signals to each other, the plurality of pixel signals being adjacent to each other in a horizontal direction, in a vertical direction, or in both horizontal and vertical directions, of the selected pixel column(s) and row(s); and processing a luminance signal and a color signal using the added pixel signals and adding a sync signal to the luminance signal and the color signal so as to output a color image signal.

13 Claims, 14 Drawing Sheets

HORIZONTAL 2-PIXEL ADDITION PROCESS IS PERFORMED

PIXEL ADDITION PROCESS IS NOT PERFORMED

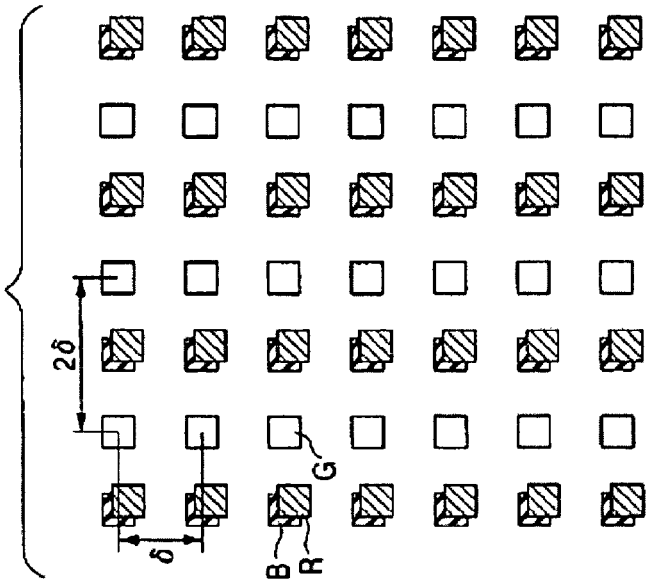
FIG. 12B HORIZONTAL 2-PIXEL ADDITION
Background Art
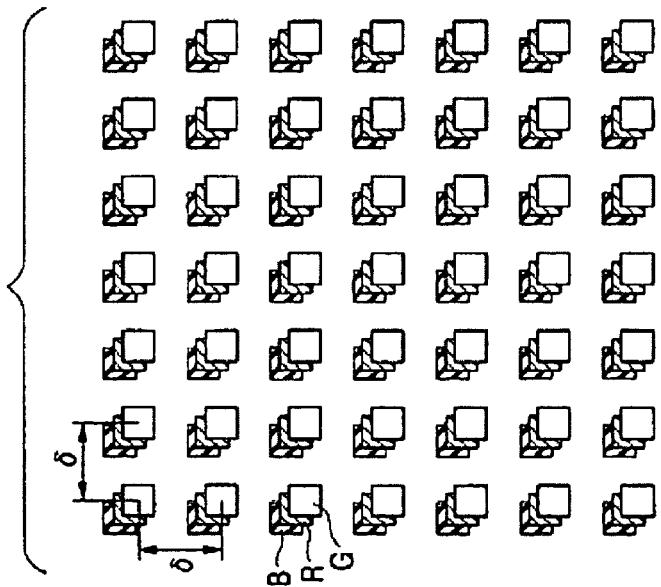
FIG. 12A NO ADDITION
Background Art

NO IMPROVEMENT IN EFFECTIVE RESOLUTION

MAXIMUM IMPROVEMENT IN EFFECTIVE RESOLUTION

SMALL IMPROVEMENT IN EFFECTIVE RESOLUTION

CAMERA SYSTEM FOR PROCESSING LUMINANCE AND COLOR SIGNALS USING ADDED PIXEL AND ADDING SYNC SIGNALS

CROSS REFERENCES TO RELATED APPLICATIONS

The present invention contains subject matter related to Japanese Patent Application JP 2006-055143 filed in the Japanese Patent Office on Mar. 1, 2006, the entire contents of which are incorporated herein by reference.

BACKGROUND OF THE INVENTION

1. Technical Field

The present invention relates to a high-sensitive three-plate color camera system, and more particularly, to a method of controlling a camera system which satisfies both high sensitivity and high resolution, and the camera system using the method.

2. Description of Related Art

In related art, there has been known a color camera system having a plurality of solid-state imaging device devices, which satisfies both high sensitivity and high resolution.

A known high-sensitive color camera system 300 disclosed in JP-B-7-075409 is shown in a block diagram of FIG. 11.

The high-sensitive color camera system 300 is configured to include solid-state imaging devices 302 to 304, a phase control circuit 307, a pixel addition control circuit 308, sample-and-hold circuits 310B, 310G, and 310R, and a sync signal generation circuit 311. In the camera system, pixels disposed in a horizontal direction of the solid-state imaging devices 302 to 304 are added to each other, thereby achieving the high-sensitivity characteristics. In a pixel addition process, a pixel addition control signal output from the pixel addition control circuit 308 is supplied to the B (blue) solid-state imaging device 302 and the R (red) solid-state imaging device 304, and a pixel addition control signal with a phase controlled by the phase control circuit 307 is supplied to the G (green) solid-state imaging device 303.

FIG. 12A shows an arrangement of pixels in a normal operation where the pixel addition process in a horizontal direction is not performed to the pixels. FIG. 12B shows a spatial arrangement of pixels in a case where two pixels in a horizontal direction are added to each other in the high-sensitive color camera system 300. In the camera system 300, the pixel addition control signal supplied to the G solid-state imaging device 303 is shifted from the pixel addition control signals supplied to the B solid-state imaging device 302 and the R solid-state imaging device 304 by an amount corresponding to one pixel so that the G pixels and the B and R pixels are alternately disposed one after the other. As a result, deterioration in the horizontal resolution of luminance signal components is reduced (see FIG. 12B).

FIG. 13 is a schematic diagram showing a spatial arrangement of pixels in a known color camera system disclosed in JP-A-2002-034049. In the arrangement, the G pixels are shifted from the B and R pixels in both horizontal and vertical directions, by an amount corresponding to a half pixel, respectively. As shown in Formula 1, luminance signals Y (for example, $Y1_{21}$, $Y1_{22}$, $Y2_{11}$, and $Y2_{12}$) are calculated and interpolated to produce an increased amount of luminance signals by four times as many as the number of pixels disposed on the G solid-state imaging device.

$$Y1_{21} = 0.3*R_{21} + 0.59*G_{21} + 0.11*B_{21}$$

$$Y1_{22} = 0.3*R_{22} + 0.59*G_{21} + 0.11*B_{22}$$

$$Y2_{11} = 0.3*R_{21} + 0.59*G_{11} + 0.11*B_{21}$$

$$Y2_{12} = 0.3*R_{22} + 0.59*G_{11} + 0.11*B_{22}$$

[Formula 1]

(The symbol "*" represents a multiplication sign.)

In stead of producing an increased amount of luminance signals by four times as many as the number of G pixels through interpolation, the high-sensitivity characteristics is achieved by reducing the number of pixels disposed on the solid-state imaging devices to ¼ and increasing a photo-receiving area for one pixel.

SUMMARY OF THE INVENTION

In the high-sensitive color camera system 300 disclosed in JP-B-7-075409, the deterioration in the horizontal resolution of the luminance signal components is reduced by controlling the pixel addition control signals supplied respectively to the G solid-state imaging device 303 and the B and R solid-state imaging devices 302 and 304 so that the G pixels and the B and R pixels are alternately disposed one after the other.

However, since the luminance signals are mainly composed of G signals, as shown in FIG. 12B, in the high-sensitive color camera system 300, the G pixels are separated from each other by a gap corresponding to 2δ (δ corresponds to a gap between adjacent pixels in the solid-state imaging device) in a horizontal direction after the horizontal two-pixel addition process, thereby greatly deteriorating the horizontal resolution compared with the case where the pixel addition process is not performed.

In the high-sensitive color camera system disclosed in JP-A-2002-034049, it is necessary to arrange the G pixels to be shifted from the B and R pixels in the horizontal and vertical directions, by an amount corresponding to a half pixel, respectively.

FIG. 14B shows an arrangement of pixels in a case where the G pixels are shifted from each other in an ideal manner. When the luminance signals are interpolated in such a pixel arrangement, a maximum effective resolution can be achieved. However, a positional irregularity is relatively large in a positioning process of the solid-state imaging device, as shown in FIG. 14C. When the G pixels are shifted to the positions of G' pixels, the luminance signals Y obtained through the interpolation are shifted toward the vicinity of the B and R pixels as the G' pixels moves closer to the B and R pixels, thereby decreasing the effective resolution.

In view of the above-mentioned situations, there is a need for producing images with high sensitivity and high resolution.

According to a first embodiment of the invention, there is provided a method of controlling a camera system having a plurality of solid-state imaging devices, the method including: supplying a horizontal addition control signal and a vertical addition control signal, phases of which are controlled, to the plurality of solid-state imaging devices; selecting pixel column(s) and row(s) of the plurality of solid-state imaging devices in accordance with the horizontal addition control signal and the vertical addition control signal; adding a plurality of pixel signals to each other, the plurality of pixel signals being adjacent to each other in a horizontal direction, in a vertical direction, or in both horizontal and vertical directions, of the selected pixel column(s) and row(s); and processing a luminance signal and a color signal using the added pixel signals and adding a sync signal to the luminance signal and the color signal so as to output a color image signal.

According to a second embodiment of the invention, there is provided a camera system including: a plurality of solid-state imaging devices; a control circuit supplying a horizontal addition control signal and a vertical addition control signal, phases of which are controlled, to the plurality of solid-state imaging devices, wherein the horizontal addition control signal and vertical addition control signal are used to add a plurality of pixel signals to each other, the plurality of pixel signals being adjacent to each other in a horizontal direction, in a vertical direction, or in both horizontal and vertical directions; and a signal processing circuit in which the added pixel signals of the plurality of pixel signals adjacent to each other in the horizontal direction, in the vertical direction, or in both horizontal and vertical directions are output from the plurality of solid-state imaging devices in accordance with the horizontal addition control signal and vertical addition control signal output from the control circuit, a luminance signal and a color signal are processed using the added pixel signals, and a sync signal is added to the luminance signal and the color signal, thereby outputting a color image signal.

In the method of controlling the camera system according to the first embodiment, a plurality of pixels are electrically shifted from each other by an arbitrary gap in a horizontal direction, in a vertical direction, or in both horizontal and vertical directions. Accordingly, it is possible to take pictures with high sensitivity and high resolution in a dark place.

In the camera system according to the second embodiment, pixels of the solid-state imaging devices are electrically shifted from each other by an arbitrary gap in a horizontal direction, in a vertical direction, or in both horizontal and vertical directions by using control signals. Accordingly, it is possible to arrange pixels with high precision.

BRIEF DESCRIPTION OF THE DRAWINGS

FIGS. 12A and 12B are diagrams showing an exemplary arrangement of pixels for explaining operations of the high-sensitive color camera system shown in FIG. 11.

DETAILED DESCRIPTION OF PREFERRED EMBODIMENTS

A CCD (charge coupled device)-type imager and a CMOS (complementary metal oxide semiconductor)-type imager are known as the solid-state imaging device, and the embodiments of the invention can be applied to either types of imagers.

First, a method of controlling a camera system employing the CCD type imager (solid-state imaging device) will be described with reference to FIGS. 1 to 5. In the embodiments, a multi-plate type solid-state imaging device, for example, a three-plate type color camera system will be used as an example of the camera system.

Hereinafter, the method of controlling the CCD-type camera system according to an embodiment of the invention will be described with reference to FIGS. 1 to 5. In the three-plate type CCD camera system, the solid-state imaging device 11 is configured to have three solid-state imaging devices, that is, an R solid-state imaging device 11R, a B solid-state imaging device 11B, and a G solid-state imaging device 11G.

Figure 1:
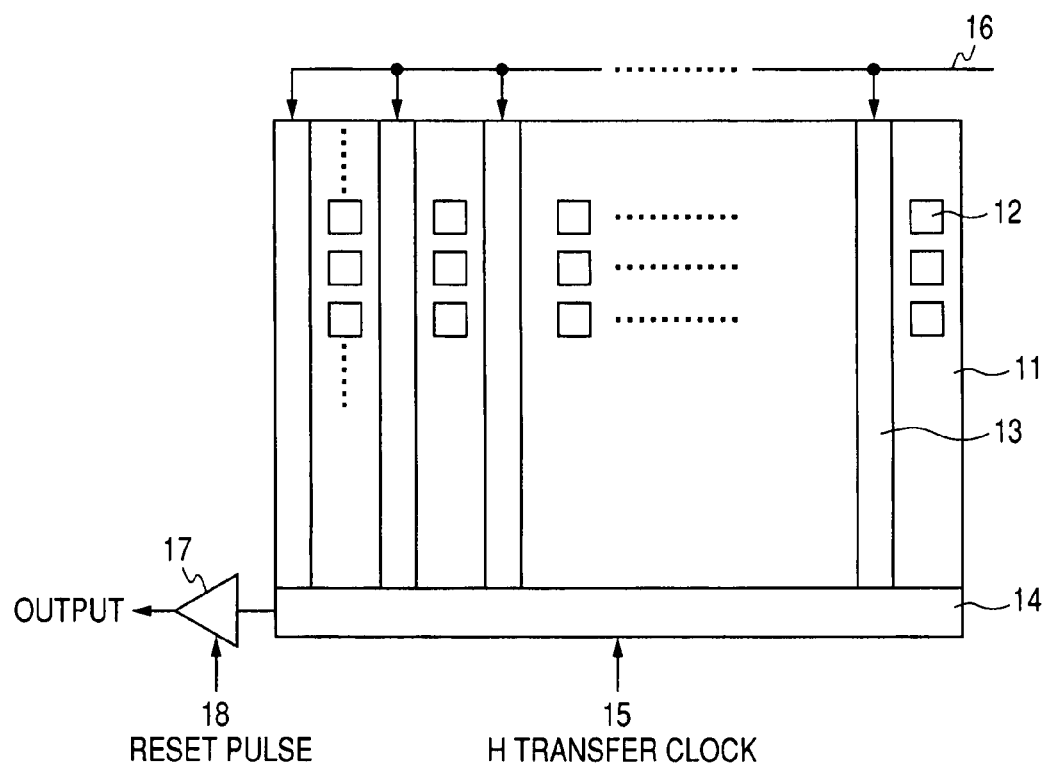
FIG. 1 is a block diagram showing a configuration of a CCD-type solid-state imaging device.

In FIG. 1, only a single solid-state imaging device 11 is illustrated for the sake of convenience. In the R, B, and G solid-state imaging devices 11R, 11B, and 11G (not shown) of the solid-state imaging device 11 illustrated in FIG. 1; pixels 12 are arranged in a matrix, vertical registers 13 are alternately disposed on pixel columns in a column direction; and a horizontal register 14 is coupled to outputs of the vertical registers 13. An output of the horizontal register 14 is coupled to a floating diffusion amplifier (FD amplifier) 17, and pixel signals are output from the FD amplifier 17.

Horizontal transfer clocks (H transfer clocks) 15 are supplied to each of the horizontal registers 14 of the R, B, and G solid-state imaging devices 11R, 11B, and 11G from a timing generator (not shown), and vertical transfer clocks (V transfer clocks) 16 are supplied to each of the vertical registers 13.

Figure 3B:
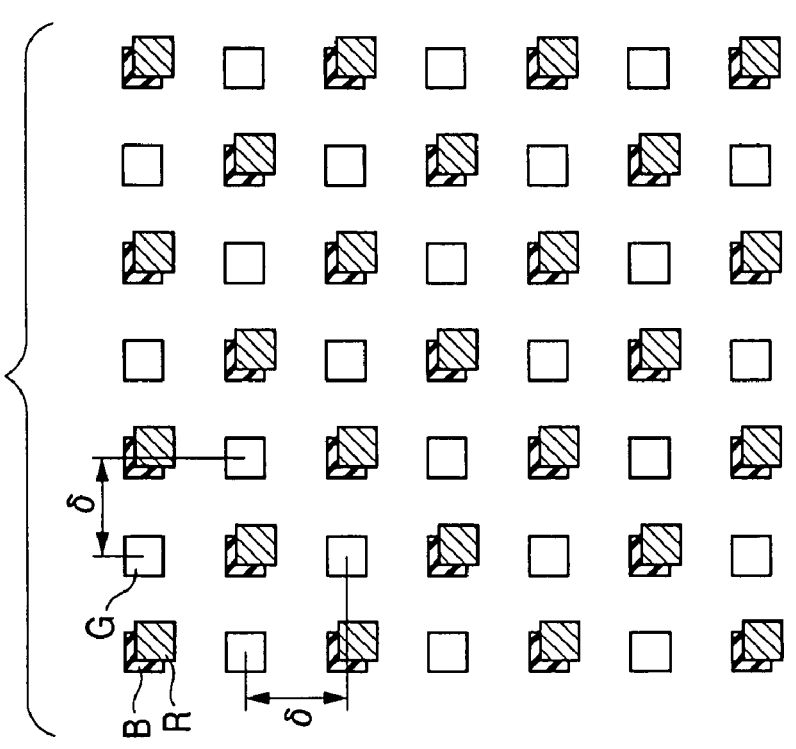
FIGS. 3A and 3B are diagrams showing an exemplary arrangement of pixels in the CCD-type camera system.
Figure 3A:
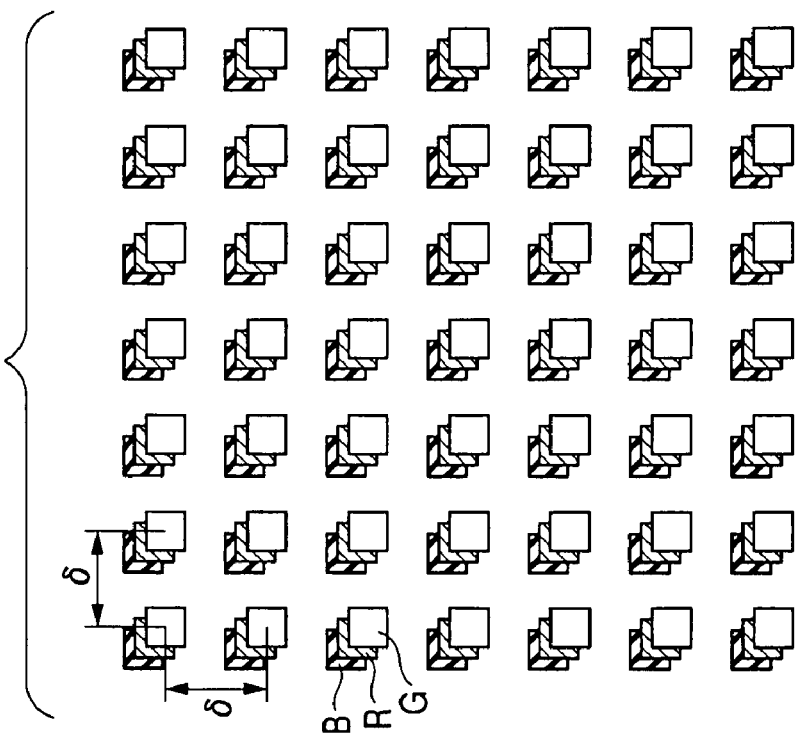

When a picture is taken in a bright place as usual, electric charges received and generated in each of the pixels 12 are transferred to the vertical registers 13, and the electric charges in the vertical registers 13 are output to the horizontal registers 14 in synchronism with the V transfer clocks 16. The pixel signals of the horizontal registers 14 are sequentially transferred to the FD amplifier 17 of the solid-state imaging devices 11R (11B and 11G) with the H transfer clocks 15 and then output to an S/H (sample and hold) circuit in a next stage. FIG. 3A shows the arrangement of pixels in a case where the pixel addition process is not performed.

On the other hand, when the picture is taken in a dark place, a control signal output from a timing generator 207 to be described later is supplied to each of the R, B, and G solid-state imaging devices 11R, 11B, and 11G.

Hereinafter, an example of a horizontal pixel addition will be described with reference to FIGS. 1 and 2. Columns of pixels arranged in a horizontal direction of the pixels will be denoted by a line 1, a line 2, a line 3, and the like in the order of a vertical direction of the columns. Each position of the pixels defined by the lines and rows is denoted by a pixel address.

Figure 2:
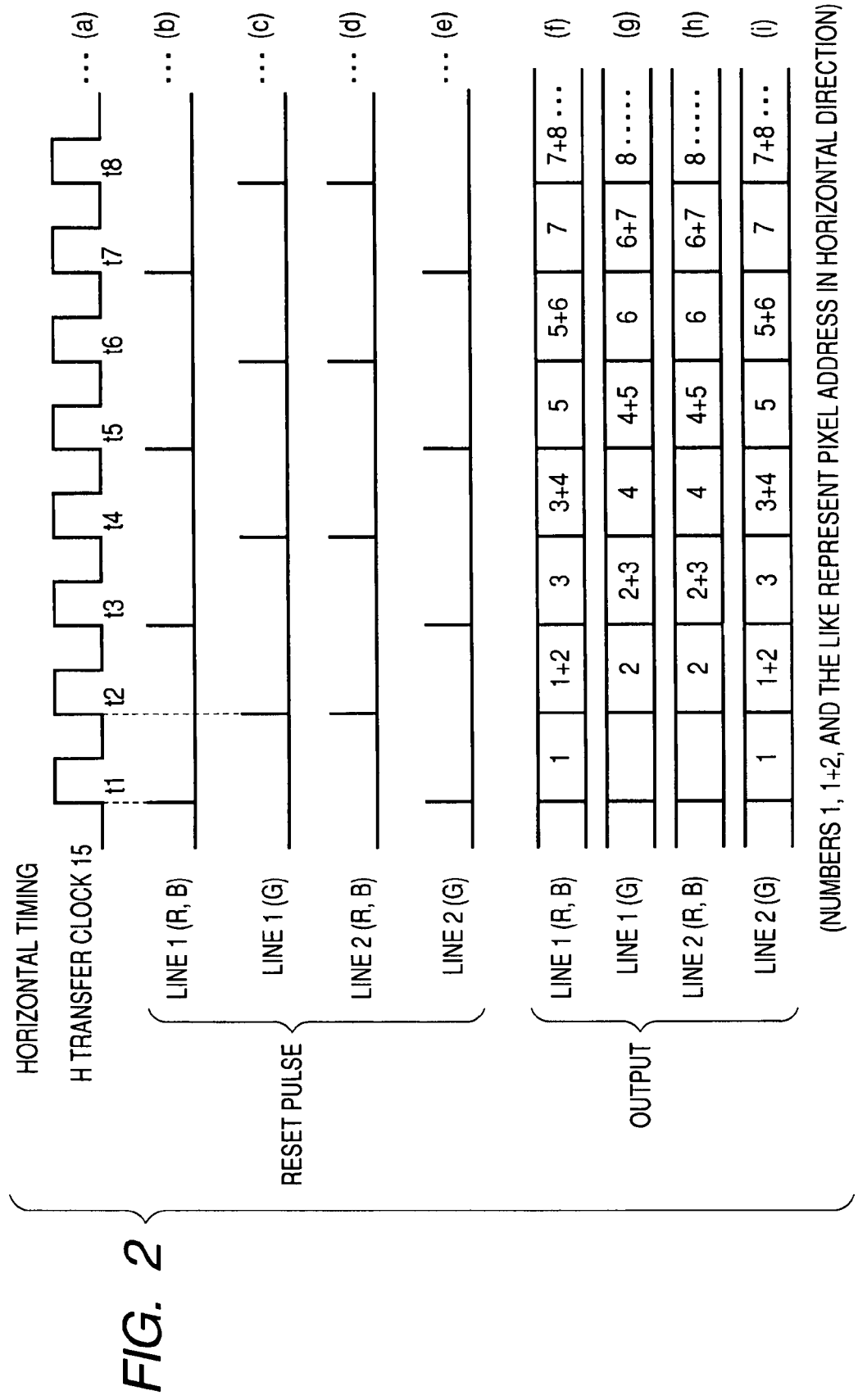
FIG. 2 shows time charts for explaining a method of controlling a CCD-type camera system.

When the H transfer clocks 15 are supplied to the horizontal registers 14 at t1, t2, ..., t8, ..., and the like, reset pulses are supplied to the line 1 of the R and B solid-state imaging devices 11R and 11B at t1, t3, t5, t7, ..., and the like, and to the line 1 of the G solid-state imaging device 11G at t2, t4, t6, t8, ..., and the like, in synchronism with the H transfer clocks (see time charts (a) to (c) of FIG. 2).

Similarly, the reset pulses are supplied to the line 2 of the R and B solid-state imaging devices 11R and 11B at t2, t4, t6, t8, ..., and the like, and to the line 2 of the G solid-state imaging device 11G at t1, t3, t5, t7, ..., and the like (see time charts (d) and (e) of FIG. 2).

In this way, the R and B pixels and the G pixels are alternately selected one after the other in a horizontal direction in every H transfer clocks in the line 1. Meanwhile, the R and B pixels and the G pixels are phase-shifted from each other by one clock of the H transfer clock (time chart (a) of FIG. 2)

between the line 1 and the line 2, and thus phase-modulated between vertical odd-numbered lines and vertical even-numbered lines.

As a result, in the line 1 of the R and B solid-state imaging devices 11R and 11B (hereinafter, simply referred to as "line 1 (R and B)"), pixels of an address 1 (hereinafter, simply referred to as "pixel address 1") are selected at t1, and the pixel address 1 and the pixel address 2 are selected at t2, thereby outputting added pixel signals. At t2, the pixel address 2 is selected in the line 1 of the G solid-state imaging device 11G (hereinafter, simply referred to as "line 1 (G)") and output therefrom. At t3, the pixel address 3 is selected in the line 1 (R and B), and the pixel addresses 2 and 3 are selected in the line 1 (G). At t4, the pixel addresses 3 and 4 are selected in the line 1 (R and B), and the pixel address 4 is selected in the line 1 (G). Subsequent pixel addresses are selected in the same manner as described above. The aspect in which the pixels in the line 1 are address-selected, then subjected to the addition process, and output from the FD amplifier 17 is shown in the time charts (f) and (g) of FIG. 2.

The pixel address 1 in the line 2 (G) is selected at t1. At t2, the pixel address 2 is selected in the line 2 (R and B), and the pixel addresses 1 and 2 are selected in the line 2 (G). At t3, the pixel addresses 2 and 3 are selected in the line 2 (R and B), and the pixel address 3 is selected in the line 2 (G). At t4, the pixel address 4 is selected in the line 2 (R and B), and the pixel addresses 3 and 4 are selected in the line 2 (G). Subsequent pixel addresses are selected in the same manner as described above. The aspect in which the pixels in the line 2 are address-selected, then subjected to the addition process, and output from the FD amplifier 17 is shown in the time charts (h) and (i) of FIG. 2.

In this way, two pixels adjacent to each other in a horizontal direction of the R, B, and G solid-state imaging devices 11R, 11B, and 11G are added to each other using the reset pulses and modulated so that the two pixels have a phase shift corresponding to a horizontal one pixel between the vertical odd-numbered lines and the vertical even-numbered lines. In this case, the reset pulses are supplied to the B and R solid-state imaging devices 11B and 11R, and output to the G solid-state imaging device 11G with a phase shift corresponding to the vertical one pixel.

The pixel signals obtained by adding two pixels in the horizontal direction are output to the R, B, and G solid-state imaging devices 11R, 11B, and 11G and then supplied to a signal processing circuit in a next stage through the S/H circuit and the like. The arrangement of pixels output from the R, B, and G solid-state imaging devices 11R, 11B, and 11G is shown in FIG. 3B.

Accordingly, the added G pixels and the added B and R pixels are alternately disposed one after the other in a space in both the horizontal and vertical directions, and the G pixels are separated from each other by a gap corresponding to δ (δ corresponds to a gap between adjacent pixels in the G solid-state imaging device) in a horizontal direction, thereby greatly improving the horizontal resolution after an interpolation process, compared with the case of FIG. 12B.

Figure 4:
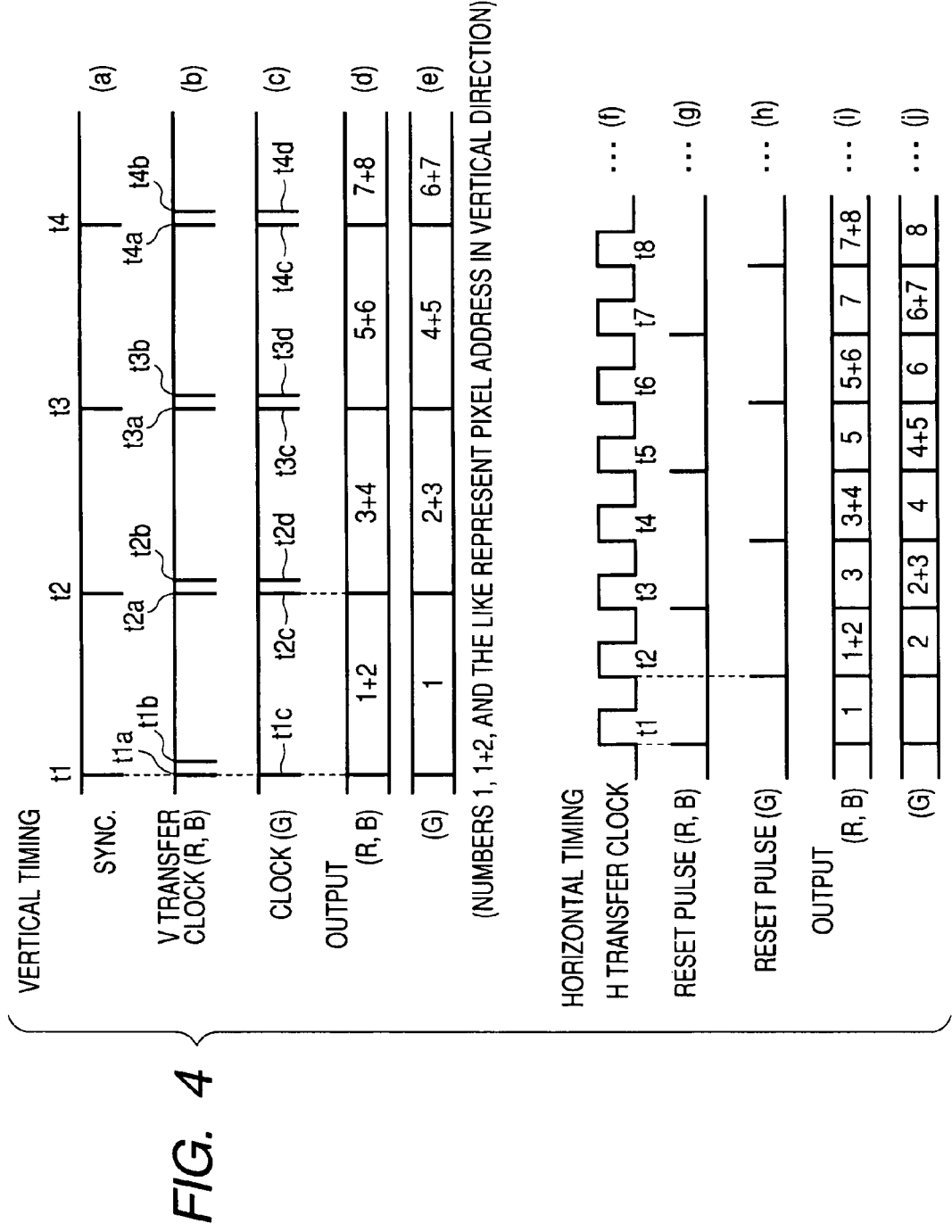
FIG. 4 shows time charts for explaining another method of controlling the CCD-type camera system.

Next, another method of controlling the CCD-type camera system constituted by the CCD will be described as an embodiment of the invention. The CCD-type camera system has the same configuration as FIG. 1, but is controlled in a different way. FIG. 4 shows time charts of the V transfer clocks, the H transfer clocks, the reset pulses, and the like, for driving the R, B, and G solid-state imaging devices 11R, 11B, and 11G constituted by the CCD.

Time charts (a) to (e) of FIG. 4 relate to vertical timings. The V transfer clocks (R and B) t1a and t1b and the V transfer clocks (G) t1c are supplied to the R, B, and G solid-state imaging devices 11R, 11B, and 11G in synchronism with t1 of H sync signals. At t2, the V transfer clocks (R and B) t2a and t2b and the V transfer clocks (G) t2c and t2d are supplied to the R, B, and G solid-state imaging devices 11R, 11B, and 11G.

Subsequently, at time t3, t4, . . . , and the like, the V transfer clocks (R and B) and the V transfer clocks (G) are supplied to the R, B, and G solid-state imaging devices 11R, 11B, and 11G, as shown in the time charts (a) to (c) of FIG. 4.

As a result, at t1 of the H sync signals, the line 1 (pixel address line 1) and the line 2 (pixel address line 2) in the vertical direction are selected at an output (R and B), and the pixel address line 1 in the vertical direction is selected at an output (G). Hereinafter, the line 1, line 2, . . . , and the like will be denoted as the pixel address line 1, pixel address line 2, . . . , and the like, in a similar manner.

At t2, the pixel address lines 3 and 4 in the vertical direction are selected at the output (R and B), and the pixel address lines 2 and 3 in the vertical direction are selected at the output (G). The aspect in which the pixels are selected in the vertical direction and the added pixel signals are output from the output (R and B) and the output (G) is shown in the time charts (d) and (e) of FIG. 4.

Next, horizontal timings for driving the R, B, and G solid-state imaging devices 11R, 11B, and 11G in each of the H sync period of the above-mentioned vertical timings will be described. The time chart (f) of FIG. 4 shows the H transfer clocks t1, t2, . . . , t8, . . . , and the like. In synchronism with the H transfer clocks, the reset pulses (R and B) are supplied to the R and B solid-state imaging devices 11R and 11B at t1, t3, t5, . . . , and the like, and the reset pulses (G) are supplied to the G solid-state imaging device 11G at t2, t4, t6, . . . , and the like.

As a result, at t1, the pixel address 1 is selected at the output (R and B), and at t2, the pixel addresses 1 and 2 and the pixel address 2 are respectively selected at the output (R and B) and the output (G), as shown in the time charts (i) and (j) of FIG. 4. At t3, the pixel address 3 is selected at the output (R and B), and the pixel addresses 2 and 3 are selected at the output (G). Subsequent pixel addresses in the horizontal direction are selected in the same manner as described above, and the added pixel signals are output from the output (R and B) and the output (G).

In this way, in the example of the vertical and horizontal pixel addition, the V transfer clocks used for adding vertical two adjacent lines to each other and the reset pulses used for adding horizontal two adjacent pixels to each other in the R, B, and G solid-state imaging devices 11R, 11B, and 11G are generated by a timing generator. The timing generator supplies the V transfer clocks with a phase shift corresponding to one H period and the reset pulses with a phase shift corresponding to a vertical one pixel to the G solid-state imaging device 11G.

The electric charges produced in the R, B, and G solid-state imaging devices 11R, 11B, and 11G with the supply of such control signals are output as the pixel signals to the signal processing circuit in the next stage through the S/H circuit.

Figure 5B:
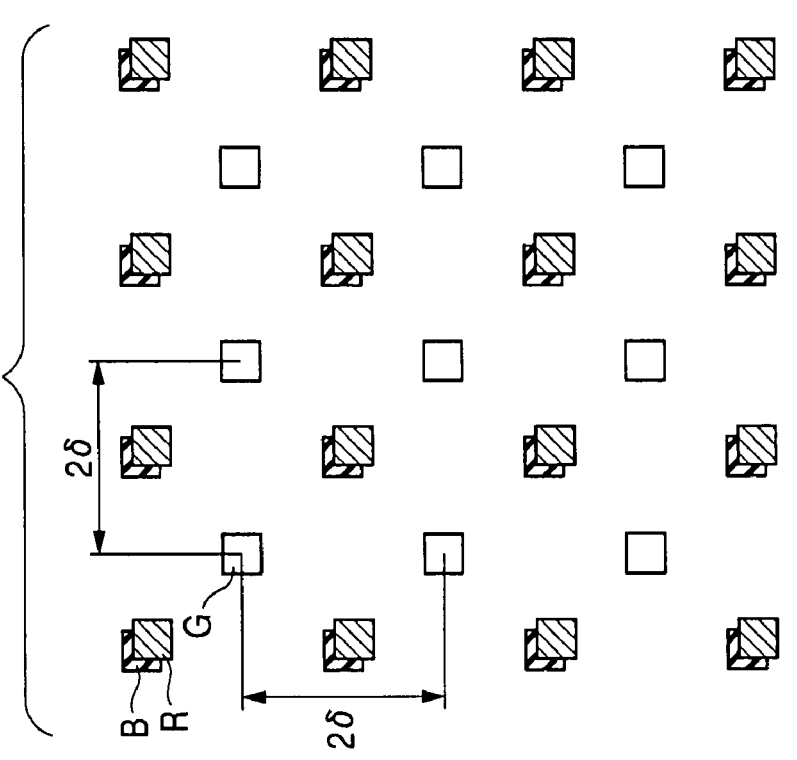
FIGS. 5A and 5B are diagrams showing another exemplary arrangement of pixels in the CCD-type camera system.

An exemplary arrangement of pixels obtained through the horizontal 2-pixel and vertical 2-pixel (line) addition process is shown in FIG. 5B.

Figure 5A:
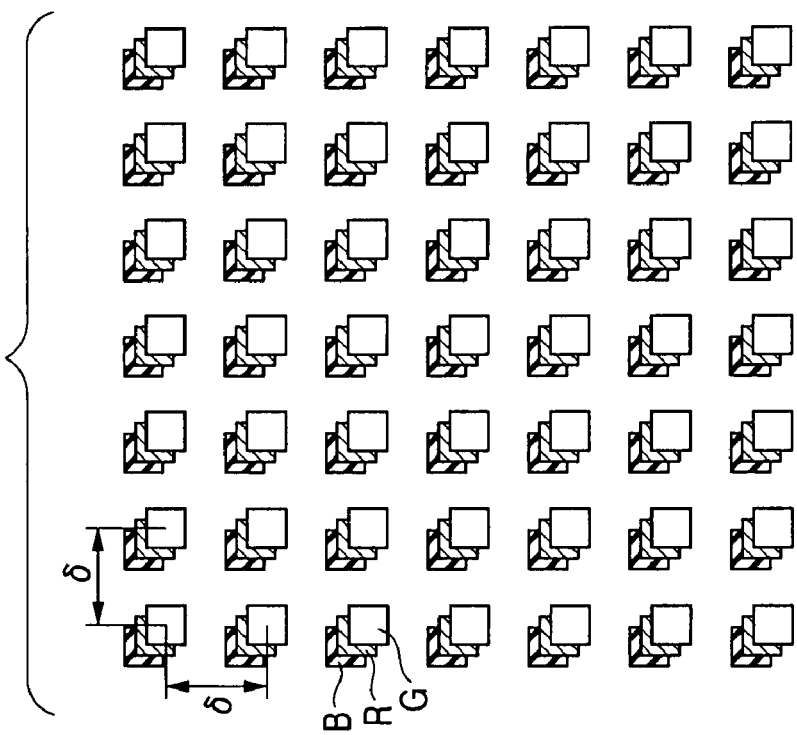

However, the pixel arrangement shown in FIG. 5B shows a prominent deterioration in the resolution, compared with the case of FIG. 5A. Therefore, luminance (Y) signals are additionally disposed in this case. That is, the luminance (Y) signals are calculated using the G pixels and the B and R pixels adjacent to the G pixels in accordance with the above-mentioned Formula 1 and interpolated to be disposed between the G pixels and the B and R pixels. With this arrangement, the sensitivity characteristics and effective resolution are improved.

In the present embodiment, the G pixels and the B and R pixels are electrically shifted from each other by the phase difference of pixel addition control signals (such as the V transfer clocks and the reset pulses). Since the precision of the pixel shifting by such an electric phase control is extremely high compared with that of a mechanical positioning, the effective resolution is greatly improved by the interpolation of the luminance signals.

Next, a method of controlling a CMOS-type camera system constituted by the CMOS will be described as another embodiment of the invention with reference to FIGS. 6 and 7.

Figure 6:
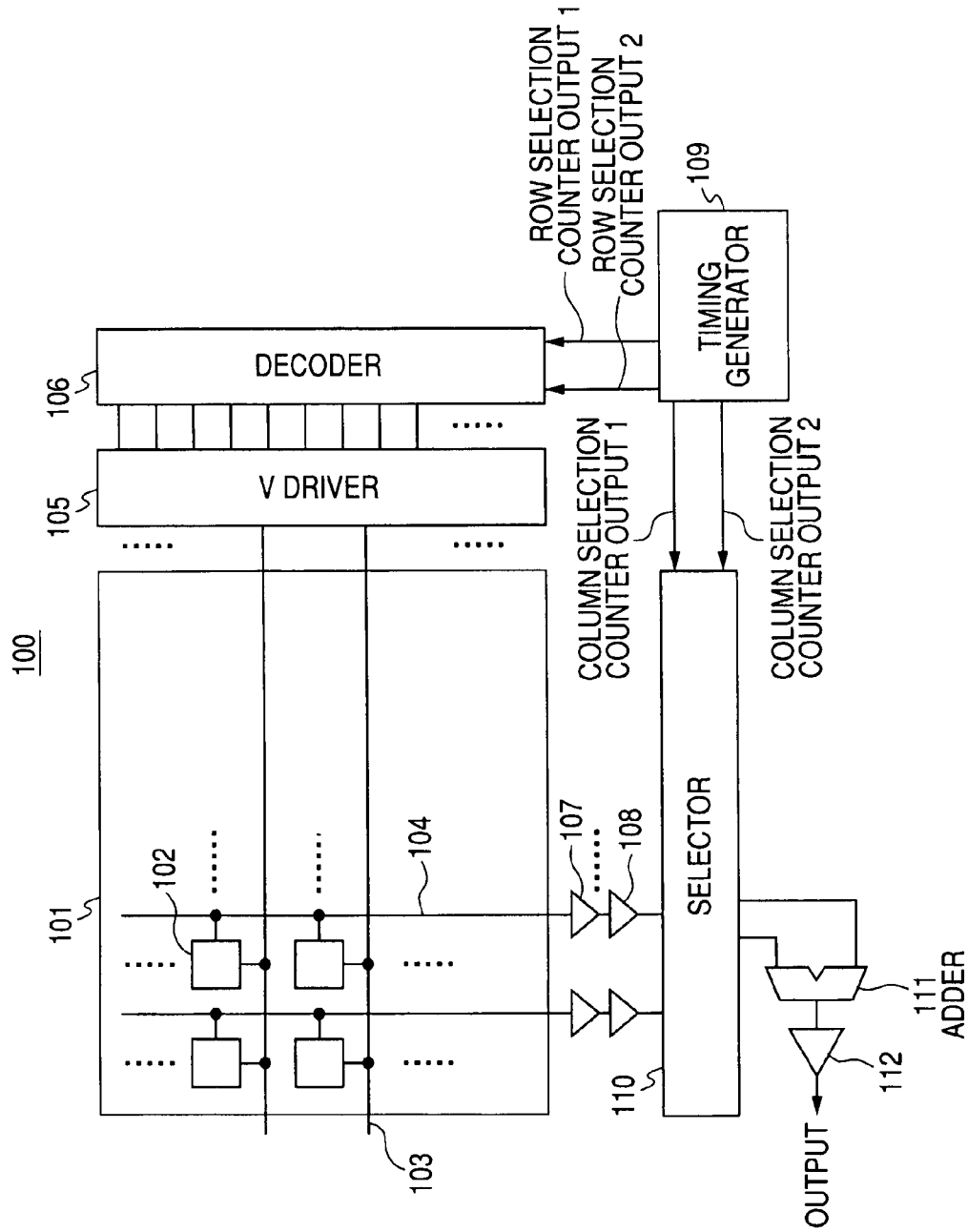
FIG. 6 is a block diagram showing a configuration of a CMOS-type solid-state imaging device.

FIG. 6 shows a block diagram of a CMOS-type camera system 100. The CMOS-type camera system 100 is configured to have R, B, and G solid-state imaging devices 101R, 101B, and 101G, each of which is configured to include pixels (photo-receiving element) 102, row selection lines 103, column selection lines 104, a V (vertical) driver 105, a decoder 106, an I-V (current to voltage) converter 107, an A/D (analog to digital) converter 108, a timing generator 109, a selector 110, an adder 111, an output circuit 112, and the like.

Row selection signals from the timing generator 109, i.e., a row selection counter output 1 and a row selection counter output 2 are supplied to the decoder 106 and decoded by the decoder 106, and the decoding result is output to the V driver 105. An arbitrary row is selected in accordance with the row selection signals output from the V driver 105.

Column selection signals from the timing generator 109, i.e., a column selection counter output 1 and a column selection counter output 2 are supplied to the selector 110, and an arbitrary column is selected in accordance with the column selection signals. Pixel signals extracted from one or two selected columns are output to the adder 111 and supplied to the output circuit 112 after being added to each other.

When a picture is taken in a bright place as usual, the row selection lines 103 are selected in accordance with the row selection signals output from the V driver 105, and an arbitrary column is selected in accordance with the column selection signals output from the column selection counter outputs 1 and 2. As a result, the selected pixel signals are supplied to the I-V converter 107 through the column signal lines 104 and then output to the A/D converter 108. The pixel signals output from the A/D converter 108 are output to the signal processing circuit in the next stage through the adder 111 and the output circuit 112 from the CMOS-type solid-state imaging devices 101R, 101B, and 101G. The electrical arrangement of pixels for this case is similar to that shown in FIG. 3A.

Next, an example of the horizontal pixel addition process when the picture is taken in a dark place will be described. First, vertical timings will be described with reference to time charts. The row selection signals are output to the decoder 106 from the row selection counter output 1 of the timing generator 109 in synchronism with t1, t2, t3, . . . , and the like of the H sync signals. At this time, the row selection signals for the lines (pixel address lines) in the vertical direction are not output from the row selection counter output 2 (see time charts (a) to (c) of FIG. 7).

In accordance with the row selection counter output 1, the pixel address line 1 in the vertical direction of the pixels is selected at t1, the pixel address line 2 is selected at t2, and similarly, the pixel address line 3 is selected at t3. At this time, the selection signal for the pixel address line in the vertical direction is not output from the row selection counter output 2.

Next, horizontal timings in one horizontal sync period will be described with reference to time charts. The horizontal timings for the line 1 (=n; n is a positive odd integer) are shown in the time charts (d) to (h) of FIG. 7. At t1 of an MCK (master clock), a pixel address 1 in the horizontal direction is selected at the column selection counter output 1 (R and B), and the pixel address 2 is selected at the column selection counter 2 (R and B). Moreover, the pixel address is not selected at the column selection counter output 1 (G), and the pixel address 1 is selected at the column selection counter output 2 (G). As a result, the selected pixel addresses 1 and 2 in the horizontal direction are added to each other by the adder 111, and the addition result is output to the output (R and B). However, the addition result is not output to the output (G).

At t2, the pixel address 3 in the horizontal direction is selected at the column selection counter output 1 (R and B), and the pixel address 4 is selected at the column selection counter output 2 (R and B). Moreover, the pixel address 2 is selected at the column selection counter output 1 (G), and the pixel address 3 is selected at the column selection counter output 2 (G). As a result, the selected pixel addresses 3 and 4 in the horizontal direction are added to each other by the adder 111, and the addition result is output from the output (R and B). Similarly, the selected pixel addresses 2 and 3 are added to each other by the adder 111, and the addition result is output from the output (G). Subsequently, the similar operations are repeatedly performed at t3, t4, . . . , and the like, as shown in the time charts (g) and (h) of FIG. 7.

Figure 7:
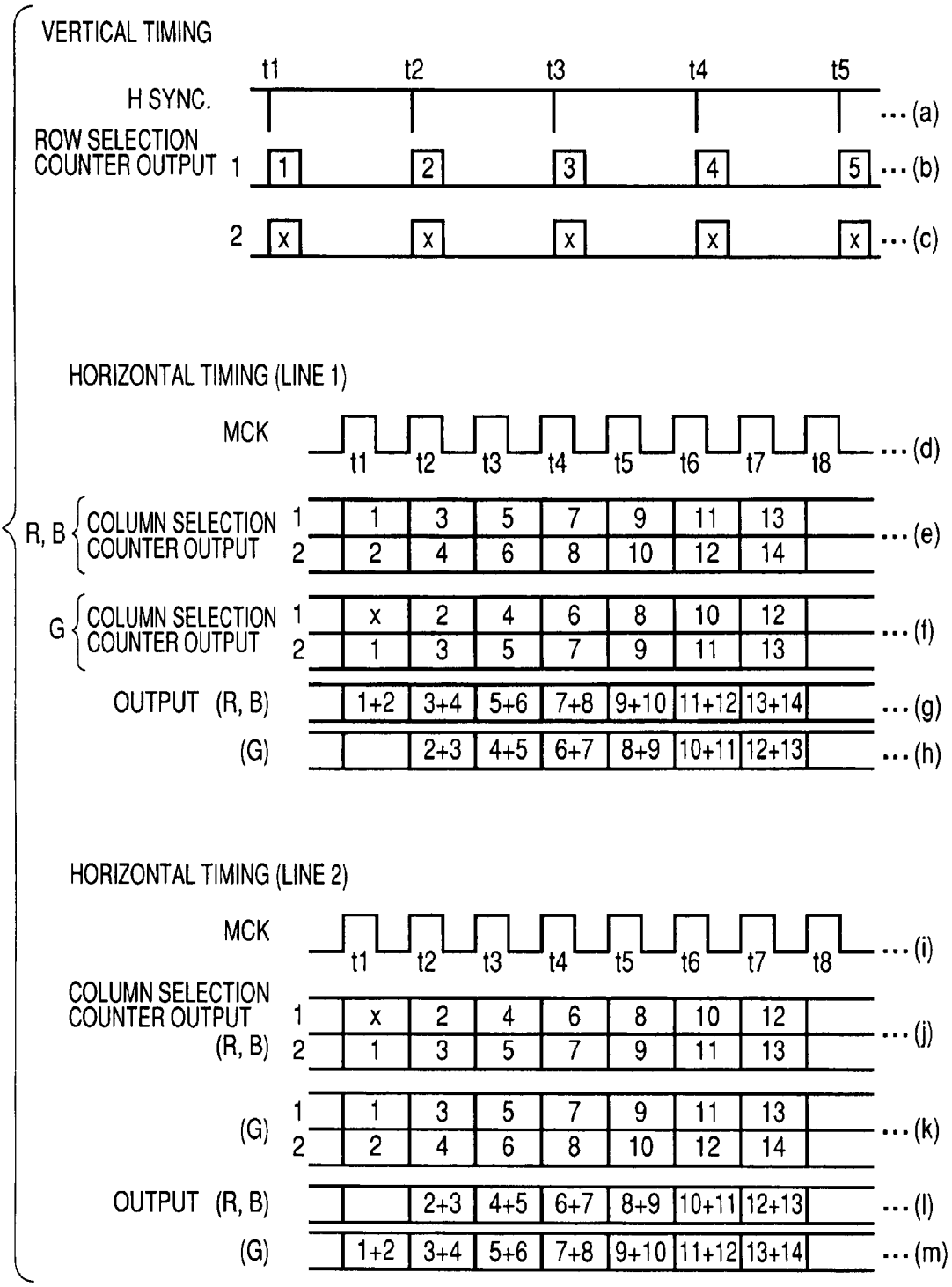
FIG. 7 shows time charts for explaining a method of controlling a CMOS-type camera system.

The horizontal timings for the line 2 (=n+1; n is a positive odd integer) are shown in the time charts (i) to (m) of FIG. 7. At t1 of the MCK, the pixel addresses in the horizontal direction are not selected at the column selection counter output 1 (R and B), and the pixel address 1 is selected at the column selection counter output 2 (R and B). Moreover, the pixel address 1 is selected at the column selection counter output 1 (G), and the pixel address 2 is selected at the column selection counter output 2 (G). The addition result output from the adder 111 is not output from the output (R and B), and the addition result of the pixel addresses 1 and 2 by the adder 111 is output from the output (G).

At t2, the pixel address 2 in the horizontal direction is selected at the column selection counter output 1 (R and B), and the pixel address 3 is selected at the column selection counter output 2 (R and B). Moreover, the pixel address 3 is selected at the column selection counter output 1 (G), and the pixel address 4 is selected at the column selection counter output 2 (G). As a result, the pixel addresses 2 and 3 in the horizontal direction are added to each other by the adder 111, and the addition result is output from the output (R and B). Similarly, the pixel addresses 3 and 4 are added to each other by the adder 111, and the addition result is output from the output (G). Subsequently, the similar operations are repeatedly performed at t3, t4, . . . , and the like, as shown in the time charts (l) and (m) of FIG. 7.

In this way, in the R, B, and G solid-state imaging devices 101R, 101B, and 101G, two pixels adjacent to each other in the horizontal direction are added to each other and then modulated so that the two pixels have a phase shift corresponding to a horizontal one pixel between the vertical odd-numbered lines and the vertical even-numbered lines. The pixel signals added in the horizontal direction are output from each of the R, B, and G solid-state imaging devices 101R, 101B, and 101G.

Then, a predetermined signal processing is performed in the signal processing circuit in the next stage. An exemplary arrangement of pixels output from the CMOS-type camera system 100 becomes the same as that shown in FIG. 3B.

Accordingly, the added G pixels and the added B and R pixels are alternately disposed one after the other in a space in both the horizontal and vertical directions, and the G pixels are separated from each other by a gap corresponding to δ (δ corresponds to a gap between adjacent pixels in the G solid-state imaging device) in a horizontal direction, thereby greatly improving the horizontal resolution after an interpolation process, compared with the case of FIG. 12B.

Next, a method of controlling the CMOS-type camera system constituted by the CMOS using a vertical and horizontal pixel addition process will be described as an embodiment of the invention with reference to FIG. 8.

Figure 8:
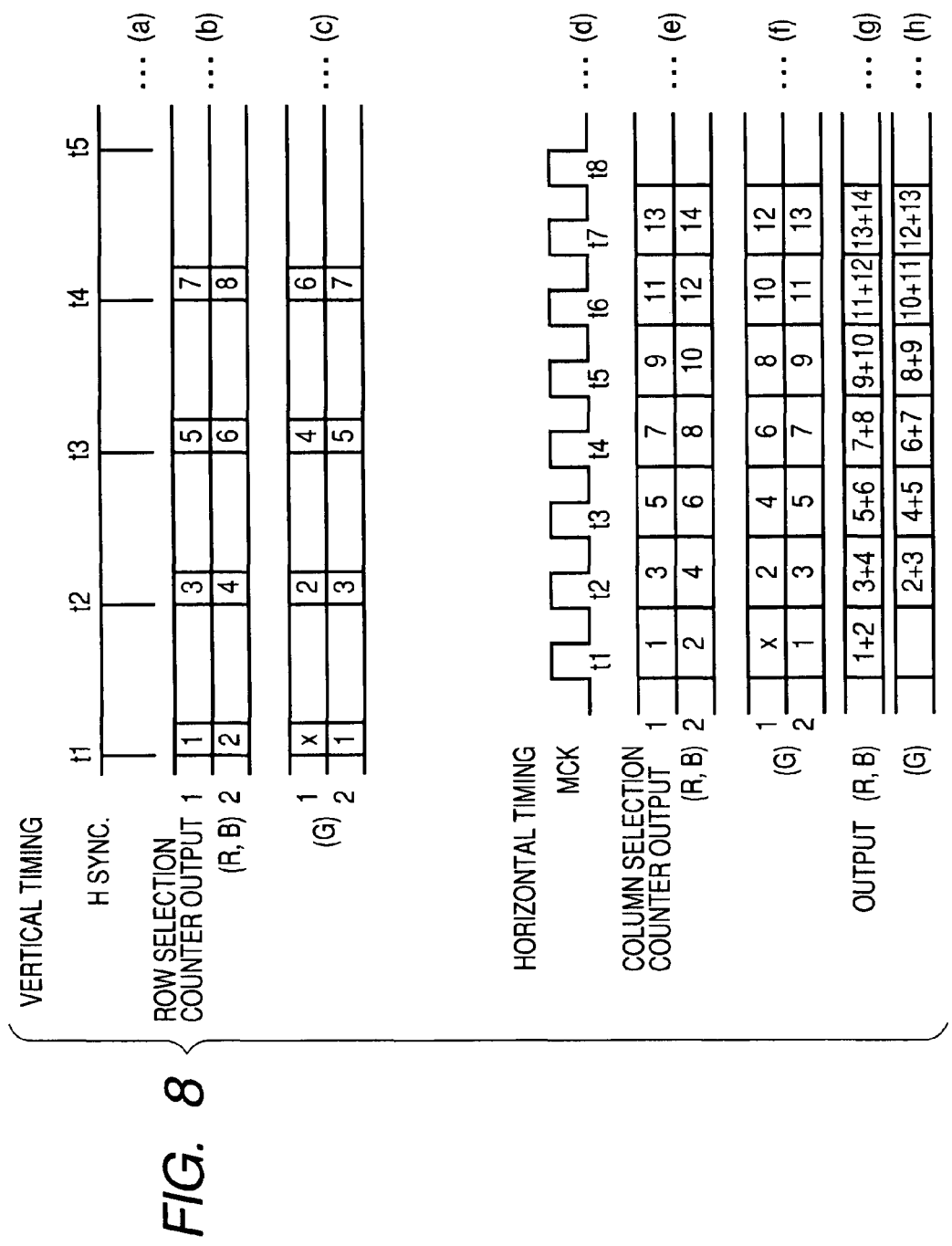
FIG. 8 shows time charts for explaining another method of controlling the CMOS-type camera system.

Time charts (a) to (c) of FIG. 8 relate to vertical timings and show specific examples of timings for the row selection counter output 1 and 2. In synchronism with t1 of the H sync signals, the pixel address line 1 in the vertical direction is selected at the row selection counter output 1 (R and B), and the pixel address line 2 in the vertical direction is selected at the row selection counter output 2 (R and B). At this time, the pixel address line is not selected at the row selection counter output 1 (G), and the pixel address line 1 is selected at the row selection counter output 2 (G).

At t2, the pixel address line 3 is selected at the row selection counter output 1 (R and B), and pixel address line 4 is selected at the row selection counter output 2 (R and B). At this time, the pixel address line 2 is selected at the row selection counter output 1 (G), and the pixel address line 3 is selected at the row selection counter output 2 (G). Subsequent pixel address lines in the vertical direction are selected in the same manner as described above.

Next, horizontal timings in one H sync period will be described with reference to time charts (d) to (f) of FIG. 8. In synchronism with t1, t2, t3, . . . , and the like of the MCK, the column selection counter output 1 and 2 (R and B) and the column selection counter output 1 and 2 (G) are activated, and the pixel addresses in the horizontal direction are selected.

At t1, the pixel address 1 in the horizontal direction is selected at the column selection counter output 1 (R and B), and the pixel address 2 is selected at the column selection counter output 2 (R and B). Moreover, the pixel address is not selected at the column selection counter output 1 (G), and the pixel address 1 is selected at the column selection counter output 2 (G). At this time, the addition result of the pixel addresses 1 and 2 by the adder 111 is output from the output (R and B). However, the addition result is not output from the output (G).

At t2, the pixel address 3 is selected at the column selection counter output 1 (R and B), and the pixel address 4 is selected at the column selection counter output 2 (R and B). Moreover, the pixel address 2 is selected at the column selection counter output 1 (G), and the pixel address 3 is selected at the column selection counter output 2 (G). At this time, the addition result of the pixel addresses 3 and 4 by the adder 111 is output from the output (R and B), and the addition result of the pixel addresses 2 and 3 by the adder 111 is output from the output (G). Subsequently, the similar operations are repeatedly performed as shown in the time charts (d) to (h) of FIG. 8.

In this way, the control signals used for adding vertical two lines and supplied from the row selection counter output 1 and 2 and the control signals used for adding horizontal two pixels and supplied from the column selection counter output 1 and 2 are supplied to the R and B solid-state imaging devices 101R and 101B, and then output to the G solid-state imaging device 101G with a phase shift corresponding to one pixel in the horizontal and vertical directions.

As a result, the pixels signals obtained by adding vertical two lines and horizontal two pixels to each other are output from the CMOS-type R, B, and G solid-state imaging devices 101R, 101B, and 101G, and a predetermined signal processing is performed in the signal processing circuit in the next stage. The arrangement of pixels becomes the same as that shown in FIG. 5B.

Since the pixel arrangement shown in FIG. 5B is the same as the case of CCD-type R, B, and G solid-state imaging devices 11R, 11B, and 11G, the effective resolution and the sensitivity characteristics can be improved by interpolating the luminance signal Y by using the G pixels and the R and B pixels adjacent to the G pixels.

Accordingly, it is possible to prevent deterioration in the horizontal resolution at the time of the horizontal pixel addition process by modulating the phase of the column selection counter output 1 and 2 between the vertical odd-numbered lines and the vertical even-numbered lines.

Moreover, the G pixels and the B and R pixels are electrically shifted from each other by the phase differences of the column selection counter output 1 and 2 and the row selection counter output 1 and 2. Since the precision of the pixel shifting by such an electric phase control is extremely high compared with that of a mechanical positioning, the effective resolution is greatly improved by the interpolation of the luminance signals.

Although an example of two pixel addition process has been described hereinabove, the invention is not limited to this. An arbitrary number of pixels may be added to each other in a horizontal direction, in a vertical direction, or in both horizontal and vertical directions.

Figure 9:
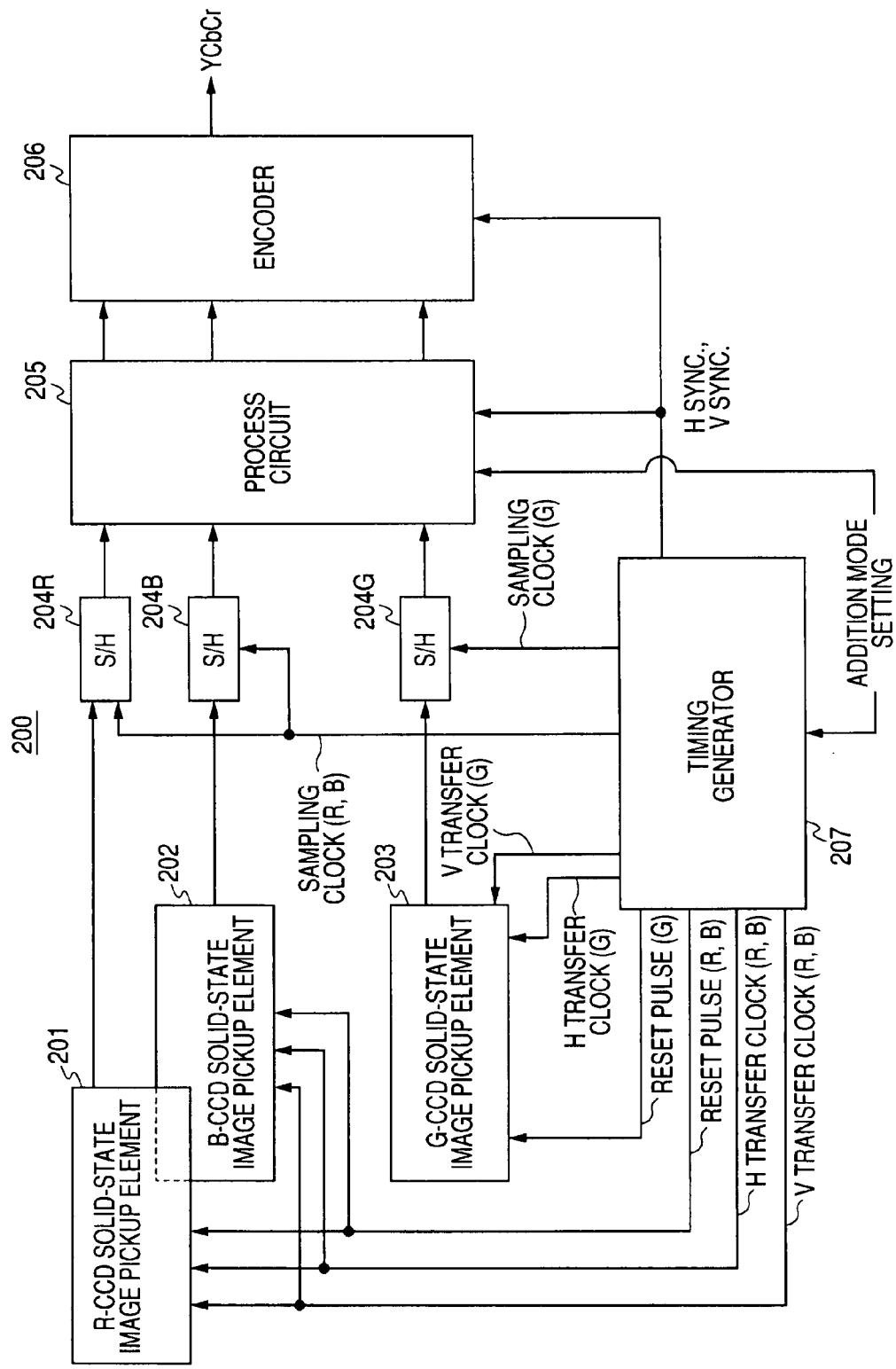
FIG. 9 is a schematic block diagram showing a configuration of the CCD-type camera system.

Next, a block diagram of a CCD-type camera system 200 using CCD-type solid-state imaging devices in accordance with another embodiment of the invention is shown in FIG. 9.

The CCD-type camera system 200 is an example of a three-plate type imaging device, and is configured to have a color separating prism (not shown); an R CCD-type solid-state imaging device 201, a B CCD-type solid-state imaging device 202, and a G CCD-type solid-state imaging device 203; S/H circuits 204R, 204B, and 204G; a process circuit 205; an encoder 206; and a timing generator 207.

The color separating prism (not shown) allows an input image to pass straight therethrough or reflected thereon and supplies the input image to the three R, B, and G CCD-type imaging devices (hereinafter, simply referred to as "R, B, and G CCD") 201 to 203. For example, when the image is input through a lens, the image having passed straight through the color separating prism is input to the G CCD 203 and the image having reflected on the color separating prism is input to the R and B CCDs 201 and 202.

In the R, B, and G CCDs 201 to 203, similar to that shown in FIG. 1, the V registers for vertical transfer are disposed between pixel lines, the H registers are disposed in the horizontal direction, and pixel signals are output from the FD amplifier.

The inputs of the S/H circuits 204R, 204B, and 204G are coupled to the outputs of the R, B, and G CCDs 201 to 203 and the output of the timing generator 207, and the outputs of the S/H circuits 204R, 204B, and 204G are coupled to the process circuit 205. In the S/H circuits 204R, 204B, and 204G, the pixel signals supplied from the R, B, and G CCDs 201 to 203 are sampled and held in synchronism with timing signals supplied from the timing generator 207. The held pixel signals are output to the process circuit 205 in the next stage.

The timing generator 207 supplies the V transfer clocks, the H transfer clocks or the reset pulses to the R, B, and G CCDs 201 to 203, and outputs sampling clocks to the S/H circuits 204R, 204B, and 204G. The timing generator 207 is supplied with control signals for setting an addition mode, in which control signals for a horizontal and vertical pixel (line) addition process are output to the R, B, and G CCDs 201 to 203.

The process circuit 205 performed a signal processing to the sampled and held pixel signals. The process circuit 205 is configured to have an A/D converter (not shown), a signal processing unit having a correction processing unit, a luminance signal processing unit, and a color signal processing unit, and the like, for example.

The correction processing unit samples and holds the pixel signals output from the R, B, and G CCDs 201 to 203 so as to extract necessary data, performs a gain control (AGC) process to adjust into a suitable level, and performs a black level adjustment. The output signals from the pre-processing unit are output to the A/D converter in the next stage.

The A/D converter converts the output signals supplied from the pre-processing unit into digital signals with a precision of 10 to 12 bits and outputs the digital signals to the signal processing unit in the next stage.

The signal processing unit is configured to have the correction processing unit, the luminance signal processing unit, the color signal processing unit, and the like, and performs a digital signal processing. In the correction processing unit, a black detection process, a digital gain control process, a lens-shading correction process, a pixel error correction process, a pixel interpolation process, a separation process of luminance signal (data) and color signal (data), and the like are performed.

The luminance signal processing unit performs various image processing processes such as an edge correction process of the luminance signals in the vertical and horizontal directions and a gamma ($\gamma$) correction process.

In the color signal processing unit, a clamping process, a process of removing noises in the color signal or a color false signal, an RGB matrix process, a white balance adjustment for varying each coefficient of R, G, and B colors, a gamma ($\gamma$) correction process, a R-G or B-G conversion process, a color difference signal (Cr or Cb) generation process, a Hue or Gain adjustment process, and the like are performed.

The encoder 206 is supplied with the luminance signal Y and the color difference signals R-Y and B-Y output from the process circuit 205 and outputs analog composite signals with the addition of sync signals. Besides the analog composite signals, other signals such as analog component signals, digital component signals are output from the encoder 206.

Next, the operations of the CCD-type camera system 200 constituted by the CCDs when it is used in a bright place as usual and in a dark place will be described with reference to FIGS. 1 to 5 and FIG. 9.

When a picture is taken in a bright place, a normal operation is performed. An exemplary arrangement of pixels for this case is shown in FIG. 3A, in which a process for improving luminance by the pixel addition process is not performed. On the other hand, when the picture is taken in a dark place, it is necessary to perform the picture taking operation with high sensitivity. An operation of obtaining the high-sensitivity characteristics by adding vertical two pixels or vertical two pixels and horizontal two pixels (lines) will be described as a specific example (see FIGS. 3B and 5B). In this case, the number of added pixels is not limited to this.

When the CCD-type camera system 200 is operated in a dark place, a photographic subject is taken as an image into the R, B, and G CCDs 201 to 203 through an optical system.

First, a case where the horizontal two pixel addition is performed at the time of taking the picture in a dark place will be described. Addition mode settings (signals) are supplied to the timing generator 207, and control signals for the horizontal two pixel addition process are generated from the timing generator 207. Then, the V transfer pulses, the H transfer pulses, and the reset pulses are supplied to the R, B, and G CCDs 201 to 203 from the timing generator 207, pixel addresses in the horizontal direction are selected, and the added pixel signals in the horizontal direction are output from the output line 1 or 2 (see the time charts (f) to (i) of FIG. 2).

The pixel signals output from the R, B, and G CCDs 201 to 203 are supplied to each of the S/H circuits 204R, 204B, and 204G and then sampled and held in synchronism with the timing signals supplied from the timing generator 207. The held pixel signals are output to the process circuit 205.

In the process circuit 205, the input pixel signals are converted into digital data (signals) by the A/D converter, and the converted data is subjected to a black-level calculation process and a gain control process so as to adjust the brightness.

The gain-controlled pixel data is subjected to a shading correction process, an error correction process, and a pixel interpolation process, and then separated into color data and luminance data.

The separated color data and luminance data are respectively supplied to the luminance signal processing unit and the color signal processing unit.

The luminance signals input to the luminance signal processing unit are filtered by an LPF (low pass filter) (not shown) so as to remove out-of-band signals or noises and output edge-emphasized data in the vertical and horizontal direction. The luminance signals are subjected to a gamma ($\gamma$) correction process.

Meanwhile, the separated color data is filtered by a CLPF (a chroma LPF) so as to remove high-frequency components, and noises and color false signals are also removed from the color data. Three primary color signals of R, G, and B are determined in an RGB matrix and are subjected to the white balance adjustment process and the gamma ($\gamma$) correction process.

The gamma ($\gamma$) corrected color data is (R-G) or (B-G) converted to produce color difference signals, that is, Cr (=R-Y) and Cb (=B-Y).

The color difference signals (R-Y) and (B-Y) and the luminance signal Y are supplied from the process circuit 205 to the encoder 206. In the encoder 206, the horizontal and vertical sync signals generated in synchronism with the timing signals supplied from the timing generator 207 are added to the color difference signals, and the analog component signals, the analog composite signals, the R, G, and B digital component signals, and the like are output from the encoder 206.

FIG. 3B shows a spatial arrangement of pixels at an input terminal of the process circuit. In the spatial arrangement of pixels obtained as a result of the interpolation process by the process circuit, the luminance signals Y become YCbCr 444 or YCbCr 422 signals having the same resolution as that shown in FIG. 3A or RGB signals having the same spatial arrangement as that shown in FIG. 3A.

Next, the operation of the CCD-type camera system 200 for the horizontal two-pixel and vertical two-pixel (line) addition process at the time of taking the picture in a dark place will be described with reference to FIG. 9.

When the horizontal two-pixel and vertical two-pixel (line) addition process is activated by the addition mode setting (signal) in the timing generator 207, the V transfer clocks synchronized with the H sync signals shown in the time charts (a) to (c) of FIG. 4, the H transfer clocks shown in the time charts (f) to (h) of FIG. 4, and the reset pulses are supplied to the R, B, and G CCDs 201 to 203 in accordance with the setting mode.

As a result, the pixel address lines in the vertical direction shown in the time charts (d) and (e) of FIG. 4 and the pixel addresses in the horizontal direction shown in the time charts (i) and (j) of FIG. 4 are selected, and the pixel signals obtained by adding two pixels to each other in the horizontal direction or the vertical direction are output from the R, B, and G CCDs 201 to 203. The pixel signals output from the R, B, and G CCDs 201 to 203 are output to the S/H circuits 204R, 204B, and 204G, and then subjected to the same processes as the above-mentioned image processing.

In this case, the interpolation process is performed to the luminance signals Y by the process circuit 205 in order to improve the resolution. The luminance signals Y disposed between the G pixels and the R or B pixels adjacent to the G pixels are derived through interpolation by using the G pixel signals and the R or B pixel signals shifted from the adjacent G pixel signals by a half pixel in the horizontal and vertical directions (see FIG. 5B).

The pixel arrangement is the same as that disclosed in JP-A-2002-034049, and it is thus possible to obtain an increased amount of luminance signals by four times as many as the number of G pixels through the interpolation, thereby increasing the sensitivity. Moreover, it is possible to improve the effective resolution by interpolating the G pixels, the number of which is decreased to ¼ through the pixel addition process, and thus increasing the number of pixels in the luminance signals.

As described above, the G pixels and the B and R pixels are electrically shifted from each other by the phase difference of the pixel addition control signals (such as the V transfer clock and the reset pulses). Since the precision of the pixel shifting by such an electric phase control is extremely high compared with that of a mechanical positioning, the effective resolution is greatly improved by the interpolation of the luminance signals.

Next, a CMOS-type camera system 250 constituted by the CMOS will be described as another embodiment of the invention.

Figure 10:
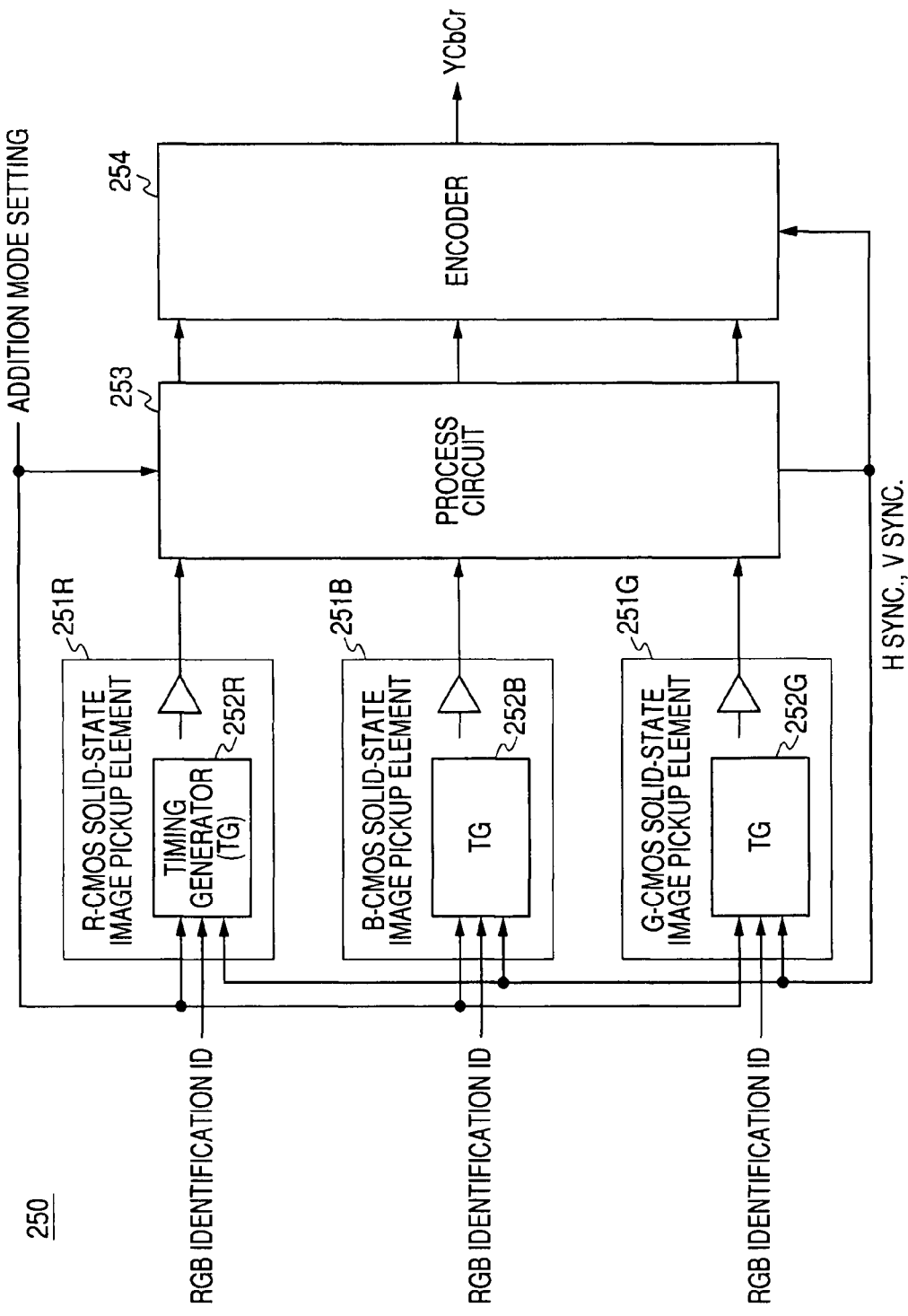
FIG. 10 is a schematic block diagram showing a configuration of the CMOS-type camera system.
Figure 11:
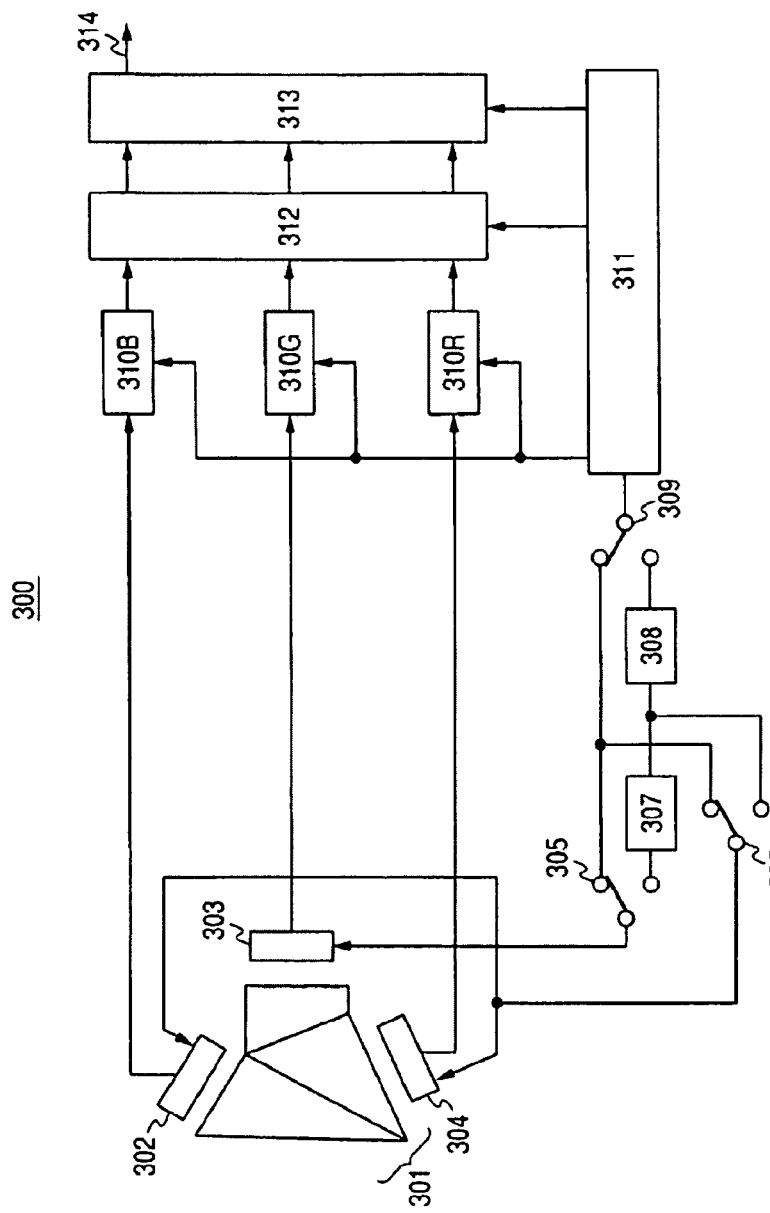
FIG. 11 is a block diagram showing a configuration of a high-sensitive color camera system known in related art.
Figure 13:
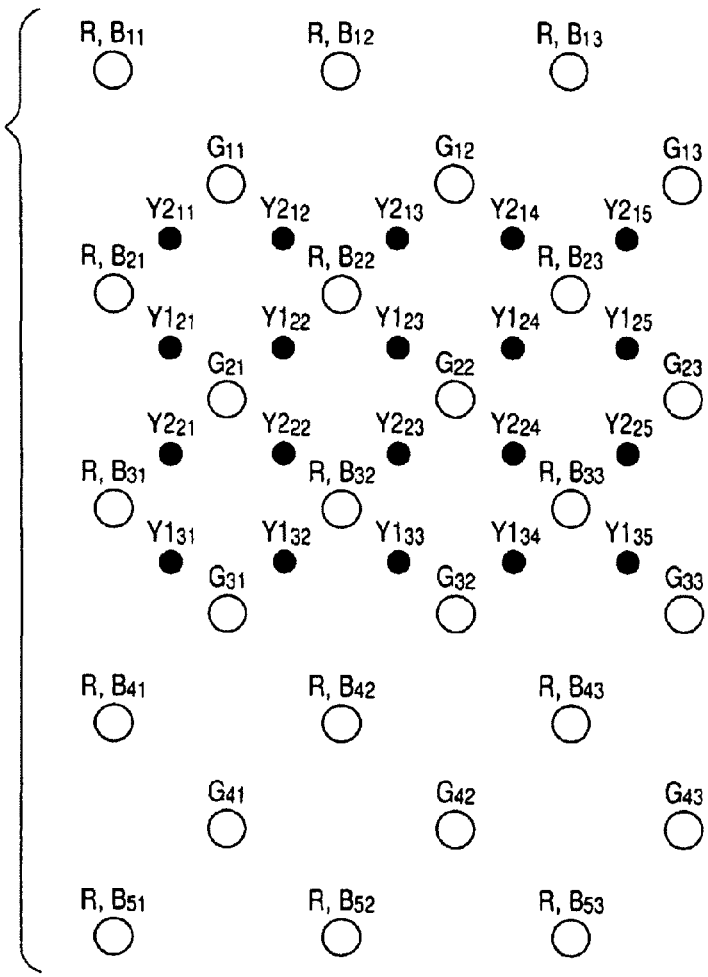
FIG. 13 is a diagram showing another exemplary arrangement of pixels for explaining operations of the high-sensitive color camera system.
Figure 14A:
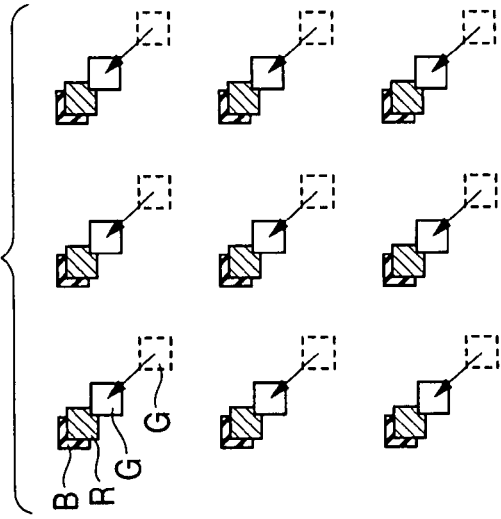
FIGS. 14A to 14C are diagrams showing a further exemplary arrangement of pixels for explaining operations of the high-sensitive color camera system.
Figure 14B:
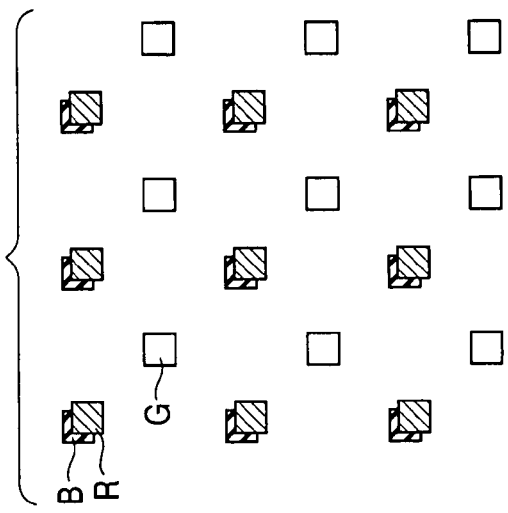
Figure 14C:
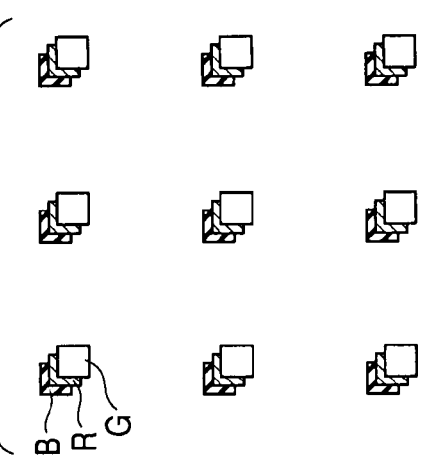

FIG. 10 shows a block diagram of the CMOS-type camera system 250. The CMOS-type camera system 250 is configured to have an R CMOS-type solid-state imaging device 251R, a B CMOS-type solid-state imaging device 251B, and a G CMOS-type solid-state imaging device 251G, a process circuit 253, an encoder 254, and the like.

The R CMOS-type solid-state imaging device 251R is formed on the same substrate as a timing generator (TG) 252R as well as photo-detection elements and circuits related to pixel signal extraction. Similarly, the B CMOS-type solid-state imaging device 251B and the G CMOS-type solid-state imaging device 251G are formed on the same substrate as a timing generator (TG) 252B and a timing generator (TG) 252G, respectively.

The process circuit 253 and the encoder 254 have the same function as that shown in FIG. 9, and thus detailed descriptions thereof will be omitted.

When a picture is taken in a bright place, a normal operation is performed. An exemplary arrangement of pixels for this case is shown in FIGS. 3A and 5A, in which a process for improving luminance by using the pixel addition is not performed. On the other hand, when the picture is taken in a dark place, it is necessary to perform the picture taking operation with high sensitivity.

An operation of obtaining the high-sensitivity characteristics by adding horizontal two pixels or vertical two pixels and horizontal two pixels (lines) at the time of taking the picture in a dark place will be described as an example (see FIGS. 3B and 5B). In this case, the number of added pixels is not limited to this.

When the CMOS-type camera system 250 is operated in a dark place, a photographic subject is taken as an image into the R, B, and G CMOS-type solid-state imaging device 251R, 251B, and 251G through an optical system.

When the picture is taken in a dark place, control signals for the addition mode settings and RGB identification IDs (signals) are supplied to each of the timing generators 252R, 252B, and 252G.

First, an example of the horizontal two pixel addition process will be described. As shown in FIG. 6, the column selection signals of the column selection counter output 1 and 2 for the horizontal two pixel addition process are output to the selector 110, and the row selection signals of the row selection counter output 1 are output to the decoder 106. The row selection signals decoded by the decoder 106 are output to the V driver 105, and the rows (row selection lines) 103 are sequentially selected in synchronism with the horizontal sync signals. The pixel addresses in the horizontal direction of the pixels are selected in accordance with the column selection signals of the column selection counter output 1 and 2, and the pixel signals added in the horizontal direction are output from the output line 1 or the output line 2 (see the time charts (g), (h), (l), and (m) of FIG. 7).

The pixel signals added in the horizontal direction are subjected to an I-V (current to voltage) conversion process and an A/D conversion process in each of the R, B, G CMOS-type solid-state imaging device 251R, 251B, and 251G, and the converted signals are output to the process circuit 253 and then output from the encoder 254 as the analog composite signals.

Next, the operation of the CMOS-type camera system 250 for the horizontal two-pixel and vertical two-pixel (line) addition process will be described as another embodiment of the invention.

When a picture is taken in a bright place, a normal operation is performed by the CMOS-type camera system 250, and the pixel addition process and the like are not performed.

When the picture is taken in a dark place, control signals for the addition mode settings and RGB identification IDs (signals) are supplied to each of the timing generators 252R, 252B, and 252G.

As shown in FIG. 6, the row selection signals of the row selection counter output 1 and 2 for the vertical two pixel (line) addition process are output to the decoder 106. The row selection signals decoded by the decoder 106 are output to the V driver 105, and two rows of addresses in the vertical direction of the pixels are sequentially selected in synchronism with the horizontal sync signals. Accordingly, two pixels (lines) in the vertical direction are added to each other at every column (see the time charts (a) to (c) of FIG. 8).

The column selection signals of the column selection counter output 1 and 2 for the horizontal two pixel addition process are output to the selector 110 thereby selecting signal lines corresponding to two columns.

Since two columns of the pixel signals obtained by adding two pixels (lines) in the vertical direction are selected in the horizontal direction and then supplied to the adder 111 through the selector 110, it is possible to obtain the pixels signals in which the horizontal two pixels and the vertical two pixels (lines) are added to each other in both the horizontal and vertical directions (see the time charts (e) to (h) of FIG. 8).

As shown in FIG. 5B, the G pixels obtained by adding the horizontal two pixels and the vertical two pixels (lines) to each other are separated from each other by a gap corresponding to 2δ (δ corresponds to a gap between adjacent pixels before the pixel addition process), and the B pixel (and R pixels) are disposed at a position shifted from the G pixels by an amount corresponding to δ in the horizontal and vertical directions.

Accordingly, the G pixels are separated from each other by an amount corresponding to 2δ in the horizontal direction and thus the resolution is deteriorated in this state. Therefore, in addition to the above-mentioned functions known in the art, a function of interpolating the luminance signals, for example as disclosed in JP-A-2002-034049 is provided to the process circuit 253. Moreover, when the picture is taken in a dark place, the interpolation is performed using the pixel signals of the G solid-state imaging device and the R and B solid-state imaging device shifted from the G solid-state imaging device by a half pixel in the horizontal and vertical directions.

The pixel signals obtained through the horizontal two-pixel and vertical two-pixel (line) addition process are subjected to the interpolation process of the luminance signal Y and other signal processing by the process circuit 253, and then output from the encoder 254 as the analog composite signals, for example.

That is, when the luminance signals are corrected by using the pixel signals obtained through the horizontal two-pixel and vertical two-pixel (line) addition process in accordance with the pixel addition mode settings at the time of taking the picture in a dark place, the horizontal resolution is deteriorated. Therefore, the luminance signals Y disposed between the G pixels and the R or B pixels adjacent to the G pixels are interpolated by using the G pixel signals and the R or B pixel signals shifted from the adjacent G pixel signals by a half pixel in the horizontal and vertical directions.

Accordingly, in the above-mentioned example of the horizontal two-pixel and vertical two-pixel (line) addition process, it is possible to obtain an increased amount of luminance signals by four times as many as the number of G pixels through the interpolation, thereby increasing the sensitivity. Moreover, by increasing the amount of luminance signals through the interpolation process, it is possible to increase the number of pixels decreased to ¼ through the pixel addition process, thereby improving the effective horizontal and vertical resolution.

As described above, the G pixels and the B and R pixels are electrically shifted from each other by the phase difference of the pixel addition control signals (such as the V transfer clock and the reset pulses). Since the precision of the pixel shifting by such an electric phase control is extremely high compared with that of a mechanical positioning, the effective resolution is greatly improved by the interpolation of the luminance signals.

Hereinabove, a method of controlling the camera system by using the horizontal two pixel addition process or the horizontal two-pixel and vertical two-pixel (line) addition process and the camera system using the same have been described. However, the number of added pixels may be four or eight and is not limited to these numbers.

As described above, according to the embodiments of the invention, since the phases of the horizontal addition control signals are modulated between the vertical odd-numbered lines and the vertical even-numbered lines, it is possible to prevent deterioration in the horizontal resolution at the time of the horizontal pixel addition process.

When the vertical pixel (line) addition process is combined with the horizontal pixel addition process, the luminance signals to be disposed between the G pixels and the R and B pixels are interpolated by controlling the phase of the pixel addition control signals supplied to the G solid-state imaging device and the phase of the pixel addition control signals supplied to the B and R solid-state imaging device, thereby achieving high-sensitivity characteristics while suppressing the deterioration in the effective resolution as much as possible.

Since the G pixels and the B and R pixels are electrically shifted from each other by the phase difference of pixel addition control signals and the precision of the pixel shifting by such an electric phase control is extremely high compared with that of a mechanical positioning, the effective resolution is greatly improved by the interpolation of the luminance signals.

Since the vertical pixel (line) addition process is combined with the horizontal pixel addition process and the number of added pixels in the vertical pixel addition process is the same as that of in the horizontal pixel addition process, it is possible to achieve the high-sensitivity characteristics without changing aspect ration before and after the addition process.

In a bright place, the picture can be taken with the high resolution without performing the pixel addition process. Even in a dark place, the picture can be taken with high sensitivity while the deterioration in the resolution is suppressed by performing the horizontal and vertical pixel addition processes in combination with the phase control of the pixel addition control signals.

It should be understood by those skilled in the art that various modifications, combinations, sub-combinations and alterations may occur depending on design requirements and other factors insofar as they are within the scope of the appended claims or the equivalents thereof.

What is claimed is:

1. A method of controlling a camera system having a plurality of solid-state imaging devices, the method comprising:
   supplying a horizontal addition control signal and a vertical addition control signal, phases of which are controlled, to the plurality of solid-state imaging devices;
   selecting a first pixel alternatively with a second pixel and a third pixel within a pixel column(s) and row(s) of the plurality of solid-state imaging devices in accordance with the horizontal addition control signal and the vertical addition control signal;
   supplying a reset pulse in accordance with the horizontal addition control signal and the vertical addition control signal to the first, second, and third pixels;
   adding a plurality of pixel signals that are adjacent in a horizontal direction, in a vertical direction, or in both horizontal and vertical directions, of the selected pixel column(s) and row(s); and
   processing a luminance signal, which is a result of the added plurality of pixel signals, a color signal, and a sync signal to output a color image signal.

2. The method of controlling the camera system according to claim 1, wherein at least one of the plurality of solid-state imaging devices is supplied with the horizontal addition control signal and the vertical addition control signal, phases of which are different from those of other solid-state imaging device, such that adding the plurality of pixels signals is according to the different phases, and wherein the luminance signal is calculated from the added plurality of pixels.

3. The method of controlling the camera system according to claim 1, wherein the phase of the horizontal addition control signal is modulated between vertically odd-numbered lines and vertically even-numbered lines.

4. The method of controlling the camera system according to claim 1, wherein the camera system is controlled by adding pixel signals being adjacent each other or using the entire pixel signals, depending on brightness of images input to the plurality of solid-state imaging devices.

5. A camera system, comprising:
   a plurality of solid-state imaging devices;
   a control circuit configured to supply a horizontal addition control signal, a vertical addition control signal, and a reset pulse in accordance with the control signals to a to the plurality of solid-state imaging devices,
   wherein the horizontal addition control signal and vertical addition control signal are used to add a plurality of pixel signals generated from selecting a first pixel alternatively with the second and third pixels that are adjacent in a horizontal direction, in a vertical direction, or in both horizontal and vertical directions; and
   a signal processing circuit in which the added pixel signals of the plurality of pixel signals adjacent are output from the plurality of solid-state imaging devices in accordance with the horizontal addition control signal and vertical addition control signal output from the control circuit, a luminance signal, which is a result of the added plurality of pixel signals, and a color signal are processed, and a sync signal is added to the luminance signal and the color signal, thereby outputting a color image signal.

6. The camera system according to claim 5, wherein at least one of the plurality of solid-state imaging devices is supplied with the horizontal addition control signal and the vertical addition control signal, phases of which are different from those of other solid-state imaging devices.

7. The camera system according to claim 5, wherein the phase of the horizontal addition control signal is modulated between vertically odd-numbered lines and vertically even-numbered lines.

8. The camera system according to claim 5,
   wherein the control circuit includes a signal conversion means, and
   wherein the signal conversion means is controlled to add pixel signals being adjacent each other or use the entire pixel signals, depending on brightness of images input to the plurality of solid-state imaging devices.

9. The camera system according to claim 5, wherein the signal processing circuit interpolates the luminance signal by using the pixel signals adjacent to each other in the solid-state imaging devices.

10. The method of controlling the camera system according to claim 1, wherein the adding a plurality of adjacent pixel signals uses the reset pulse supplied to the first, second, and third pixels.

11. The camera system according to claim 5, wherein a first device of the solid-state imaging devices is comprised of a set of first pixels arranged in a matrix, wherein adjacent first pixels are separated by a gap.

12. The camera system according to claim 5, wherein the first, second, and third pixels respectively correspond to a first, a second, and a third set of pixels, and
   wherein the first, the second, and the third set of pixels respectively correspond to a first, a second, and a third solid-state imaging device of the plurality of solid-state imaging devices.

13. A method, comprising:
   supplying a horizontal addition control signal and a vertical addition control signal to a first solid-state imaging device, a second solid-state imaging device, and a third solid-state imaging device of a plurality of solid-state imaging devices;
   selecting a first pixel of the first solid-state imaging device alternatively with a second pixel of the second solid-state imaging device and a third pixel of the third solid-state imaging device within each devices pixel matrix in accordance with the supplied control signals to generate a plurality of pixel signals;
   adding the plurality of pixel signals to generate a luminance signal; and
   processing a luminance signal and a color signal with a sync signal to output a color image signal,
   wherein the first, the second, and the third pixels are positionally adjacent on their respective pixel matrices.

* * * * *